US012673857B2

(12) United States Patent
Lee et al.

(10) Patent No.: US 12,673,857 B2
(45) Date of Patent: Jul. 7, 2026

(54) OHT VEHICLE AND METHOD OF CONTROLLING OPERATION OF THE SAME

(71) Applicant: SEMES CO., LTD., Cheonan-si (KR)

(72) Inventors: Jun Beom Lee, Hwaseong-si (KR); Dong Hoon Yang, Anyang-si (KR)

(73) Assignee: SEMES CO., LTD., Cheonan-si (KR)

( * ) Notice: Subject to any disclaimer, the term of this patent is extended or adjusted under 35 U.S.C. 154(b) by 765 days.

(21) Appl. No.: 17/985,854

(22) Filed: Nov. 13, 2022

(65) Prior Publication Data

US 2023/0159312 A1 May 25, 2023

(30) Foreign Application Priority Data

Nov. 24, 2021 (KR) ........................ 10-2021-0163664

(51) Int. Cl.
| *B66F 9/07* | (2006.01) |
| *B61B 3/02* | (2006.01) |
| *B61B 10/00* | (2006.01) |
| *B65G 1/04* | (2006.01) |
| *E01B 25/22* | (2006.01) |

(52) U.S. Cl.
CPC ................ *B66F 9/072* (2013.01); *B61B 3/02* (2013.01); *B61B 10/001* (2013.01); *B65G 1/0421* (2013.01); *E01B 25/22* (2013.01)

(58) Field of Classification Search
CPC ......... B66F 9/072; B61B 3/02; B61B 10/001; B65G 1/0421; E01B 25/22
See application file for complete search history.

(56) References Cited

FOREIGN PATENT DOCUMENTS

| DE | 10142154 A1 * | 4/2002 | ........... B62D 5/0466 |
| KR | 20120034942 A * | 4/2012 | .............. B66C 9/04 |
| KR | 10-2018-0039775 | 4/2018 | |
| KR | 10-2021-0091412 | 7/2021 | |

* cited by examiner

*Primary Examiner* — Robert J McCarry, Jr.

(57) ABSTRACT

Proposed are an OHT vehicle and a method of controlling the operation of the same. More particularly, proposed is a technology in which when a steering change is not performed properly as a steering wheel is adhered to a damper during the operation of a steering unit of an OHT vehicle, a dithering motion function is applied to the steering wheel to enable an efficient steering change of the OHT vehicle.

20 Claims, 11 Drawing Sheets

OHT VEHICLE AND METHOD OF CONTROLLING OPERATION OF THE SAME

CROSS REFERENCE TO RELATED APPLICATION

The present application claims priority to Korean Patent Application NO. 10-2021-0163664, filed Nov. 24, 2021, the entire contents of which is incorporated herein for all purposes by this reference.

BACKGROUND OF THE INVENTION

Field of the Invention

The present disclosure relates generally to an OHT vehicle and a method of controlling the operation of the same. More particularly, the present disclosure relates to a technology in which when a steering change is not performed properly due to various factors such as a state where a steering wheel is adhered to a damper and becomes immovable during the operation of a steering unit of an OHT vehicle, a dithering motion function is applied to the steering wheel to enable an efficient steering change of the OHT vehicle.

Description of the Related Art

In semiconductor manufacturing, a variety of numerous processes are performed to yield the final product, and hundreds of thousands of cargo transfers occur in the process of performing the semiconductor manufacturing process. To prevent contamination and damage to semiconductor materials and delivery accidents during the cargo transfer process, an overhead hoist transfer (OHT) is utilized as an automated transfer system on the semiconductor manufacturing line. The OHT is a system that automates cargo transfer between numerous semiconductor processes. An OHT vehicle transfers wafers contained in a front opening unified pod (FOUP) to manufacturing equipment for each manufacturing process along a rail installed on the ceiling.

FIGS. 1A and 1B illustrate schematic views of the configuration of a cargo transfer automation system to which OHT is applied.

A vehicle 30 for OHT travels on a rail 40 installed on the ceiling and is wirelessly interfaced with an OHT control system (OCS) 20 that issues a transfer operation command. The OCS 20 receives a transfer command according to an operation process from a material control system (MCS) 10, searches for the shortest route from a starting point to a destination to enable the vehicle 30 to complete the transfer operation in the shortest time in accordance with the command from the MCS 10, selects a vehicle in an optimal position suitable for performing the transfer operation, and then issues the transfer command. The vehicle 30 transfers cargo from an arbitrary port commanded by the OCS 20 to a destination port in accordance with the transfer command from the OCS 20.

Numerous branching regions exist in the movement path of the vehicle 30. The vehicle 30 includes a traveling unit and a steering unit. The vehicle 30 is driven to travel on the rail 40 by driving of the traveling unit, and the traveling direction of the traveling unit may be changed according to the operation of the steering unit.

The steering unit may move a steering wheel to the right or left to bring the steering wheel into contact with a steering rail, so that the traveling direction of the traveling unit may be changed according to the guidance of the steering rail.

Proper steering can be achieved only when the steering wheel of the steering unit is efficiently moved to the right or left depending on the desired steering direction. However, there are cases in which the movement of the steering wheel is not performed properly due to various factors. For example, after the steering wheel is moved in a specific direction, the steering wheel may be strongly adhered to the damper and become immovable.

In particular, when the steering of the vehicle is not properly performed in the branching regions in a situation where tens to hundreds of vehicles are simultaneously operating on the rail, a collision may occur between a preceding vehicle and a following vehicle or the overall cargo transfer may be delayed. Therefore, the rapid and accurate steering operation of the vehicle is an important factor in the operation of the cargo automation system.

The foregoing is intended merely to aid in the understanding of the background of the present disclosure, and is not intended to mean that the present disclosure falls within the purview of the related art that is already known to those skilled in the art.

SUMMARY OF THE PRESENT DISCLOSURE

Accordingly, the present disclosure has been made keeping in mind the above problems occurring in the related art, and an objective of the present disclosure is to solve the problem in which a steering wheel of a vehicle cannot be properly moved in the branching regions on a rail due to various factors.

In particular, an objective of the present disclosure is to solve to the problem in which the steering wheel is adhered to a damper and cannot be moved by applying a dithering motion function to the steering wheel.

Furthermore, an objective of the present disclosure is to solve the problem in which when the steering of the vehicle is not properly performed in the branching regions in a situation where tens to hundreds of vehicles are simultaneously operating on the rail, a collision occurs between a preceding vehicle and a following vehicle or the overall cargo transfer is delayed.

The objectives of the present disclosure are not limited to the objectives mentioned above, and other objectives and advantages of the present disclosure which are not mentioned may be understood by the following description.

In order to achieve the above objectives, according to one aspect of the present disclosure, there is provided a method of controlling operation of an OHT vehicle, the method including: a steering wheel movement determining step of determining a moving direction of a steering wheel in accordance with a traveling direction of the OHT vehicle in a branching region of a rail; a dithering motion applying step of applying a dithering motion to the steering wheel; and a steering wheel moving step of moving the steering wheel in accordance with the traveling direction of the OHT vehicle.

In an embodiment, the dithering motion applying step may be performed by applying the dithering motion to the steering wheel by sequentially and repeatedly applying a forward torque corresponding to the moving direction of the steering wheel and a reverse torque.

As an example, the dithering motion applying step may be performed by applying the dithering motion to the steering wheel by sequentially and repeatedly applying to a steering wheel driving means, a forward dithering current corresponding to the moving direction of the steering wheel and a reverse dithering current.

As an example, the dithering motion applying step may be performed by applying a dithering current higher by a set range than a moving current applied to move the steering wheel.

Furthermore, the dithering motion applying step may be performed by repeatedly performing the applying of the dithering motion to the steering wheel in accordance whether a set dithering condition is satisfied.

As an example, the steering wheel movement determining step may be performed by determining a moving state of the steering wheel by applying to a steering wheel driving means, a moving determination current corresponding to the moving direction of the steering wheel.

In an embodiment, the steering wheel movement determining step may include: determining the traveling direction of the OHT vehicle in the branching region on the rail; and determining whether it is necessary to move the steering wheel in accordance with the traveling direction of the OHT vehicle on the basis of a current position of the steering wheel.

As an example, the steering wheel moving step may include: moving the steering wheel by applying a moving current corresponding to the moving direction of the steering wheel; and maintaining the position of the steering wheel by applying a holding current.

Furthermore, the steering wheel movement determining step or the steering wheel moving step may be performed for each of a front end steering wheel and a rear end steering wheel.

According to an aspect of the present disclosure, there is provided an OHT vehicle including: a traveling unit configured to travel on a rail; a steering unit configured to change a traveling direction of the traveling unit; and a control unit configured to determine a moving direction of the steering unit in accordance with the traveling direction of the traveling unit in a branching region on the rail, and control dithering motion performance of the steering unit and movement of the steering unit.

In an embodiment, the control unit may control a steering wheel driving means of the steering wheel by sequentially and repeatedly applying a forward torque corresponding to a moving direction of a steering wheel of the steering unit and a reverse torque.

As an example, the control unit may include a steering unit controller configured to apply the dithering motion to the steering wheel by sequentially and repeatedly applying to the steering wheel driving means of the steering wheel, a forward dithering current corresponding to the moving direction of the steering wheel and a reverse dithering current.

As an example, the steering unit controller may include: a dithering motion part configured to apply the dithering motion to the steering wheel by sequentially and repeatedly applying to the steering wheel driving means, the forward dithering current corresponding to the moving direction of the steering wheel and the reverse dithering current; and a steering wheel control part configured to move the steering wheel by applying a moving current to the steering wheel driving means.

Furthermore, the steering wheel control part may maintain the position of the steering wheel by applying a holding current to the steering wheel driving means after the steering wheel is moved by the application of the moving current.

In an embodiment, the dithering motion part may apply a dithering current higher by a set range than the moving current applied to move the steering wheel.

Furthermore, the steering unit controller may further include a steering movement determining part configured to determine whether it is necessary to move the steering wheel in accordance with the traveling direction of the OHT vehicle on the basis of a current position of the steering wheel.

As an example, the steering movement determining part may determine a moving state of the steering wheel by applying to the steering wheel driving means, a moving determination current corresponding to the moving direction of the steering wheel.

Furthermore, the control unit may further include a traveling unit controller configured to determine the traveling direction in the branching region on the rail and control a traveling wheel driving means of the traveling unit.

In an embodiment, the steering unit may include a front end steering unit and a rear end steering unit, and the control unit may control the dithering motion performance and movement of each of the front end steering wheel and the rear end steering wheel.

As an aspect of the present disclosure, there is provided a method of controlling operation of an OHT vehicle, the method including: a steering wheel movement determining step of determining a traveling direction of the OHT vehicle in a branching region on a rail and determining whether it is necessary to move a steering wheel in accordance the traveling direction of the OHT vehicle on the basis of a current position of the steering wheel; a dithering motion applying step of applying a dithering motion to the steering wheel by sequentially and repeatedly applying to a steering wheel driving means, a forward dithering current corresponding to the moving direction of the steering wheel and a reverse dithering current for a set dithering time; and a steering wheel moving step of applying to the steering wheel driving means, a moving current corresponding to the moving direction of the steering wheel to cause the steering wheel to be moved, and applying a holding current to cause the steering wheel to maintain its position.

According to the present disclosure as described above, it is possible to provide a dithering motion function for shaking the steering wheel to release an immovable state of the steering wheel, thereby achieving an efficient steering change of the OHT vehicle.

In particular, the present disclosure can solve the problem in which when the steering of the vehicle is not properly performed in the branching regions in a situation where tens to hundreds of vehicles are simultaneously operating on the rail, a collision occurs between a preceding vehicle and a following vehicle or the overall cargo transfer is delayed.

Furthermore, the present disclosure can minimize an impact caused by the dithering motion by determining whether the steering wheel can be moved properly and providing the dithering motion when the steering wheel is in an immovable state.

The effects of the present disclosure are not limited to the effects mentioned above, and other effects not mentioned will be clearly understood by those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, exemplary embodiments of the present disclosure will be described in detail with reference to the accompanying drawings, but the present disclosure is not limited or restricted by the described embodiments.

For a better understanding of the disclosure, its operating advantages and the specific objectives attained by its uses, reference is made to the descriptive matter in which the exemplary embodiments of the disclosure are illustrated.

The terminology used herein is for the purpose of describing particular embodiments only and is not intended to be limiting. As used herein, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

In the following description, detailed descriptions of known functions and components incorporated herein will be omitted when it may make the subject matter of the present disclosure unclear.

The present disclosure proposes a technology in which when a steering change is not performed properly due to various factors such as a state where a steering wheel is adhered to a damper and becomes immovable during the operation of a steering unit of an OHT vehicle, a dithering motion function is applied to the steering wheel to enable an efficient steering change of the OHT vehicle.

In the present disclosure, the dithering motion refers to an operation of releasing, when a steering wheel is in an immovable state, the immovable state of the steering wheel by shaking the steering wheel.

As described above, the present disclosure proposes a method of solving the problem in which the steering wheel of the OHT vehicle cannot be properly moved in the branching regions on a rail due to various factors by applying a dithering motion to the steering unit of the OHT vehicle.

Reference now will be made to embodiments of the present disclosure.

Figure 1A:
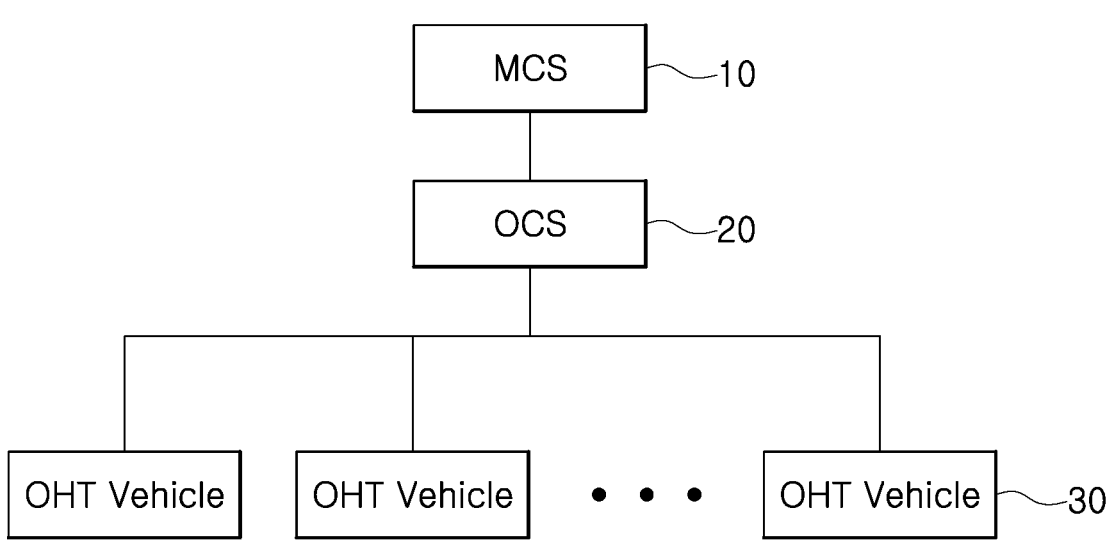
FIGS. 1A and 1B are schematic views illustrating the configuration of a cargo transfer automation system to which OHT is applied.
Figure 1B:
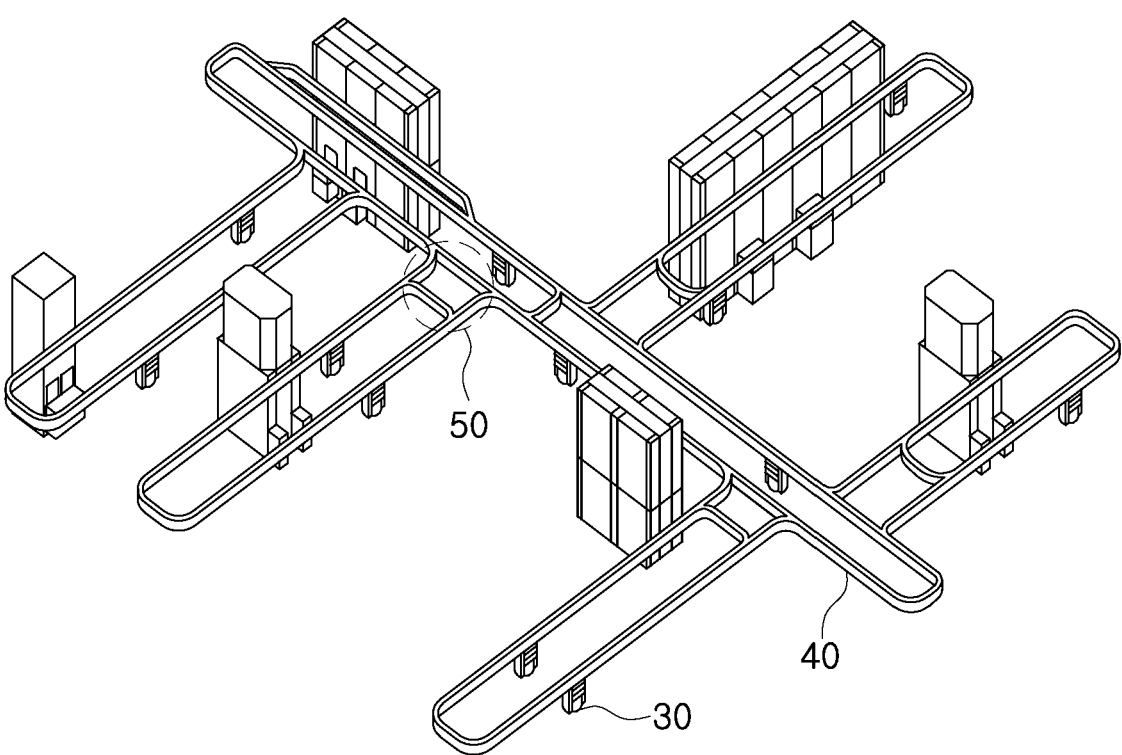
Figure 2:
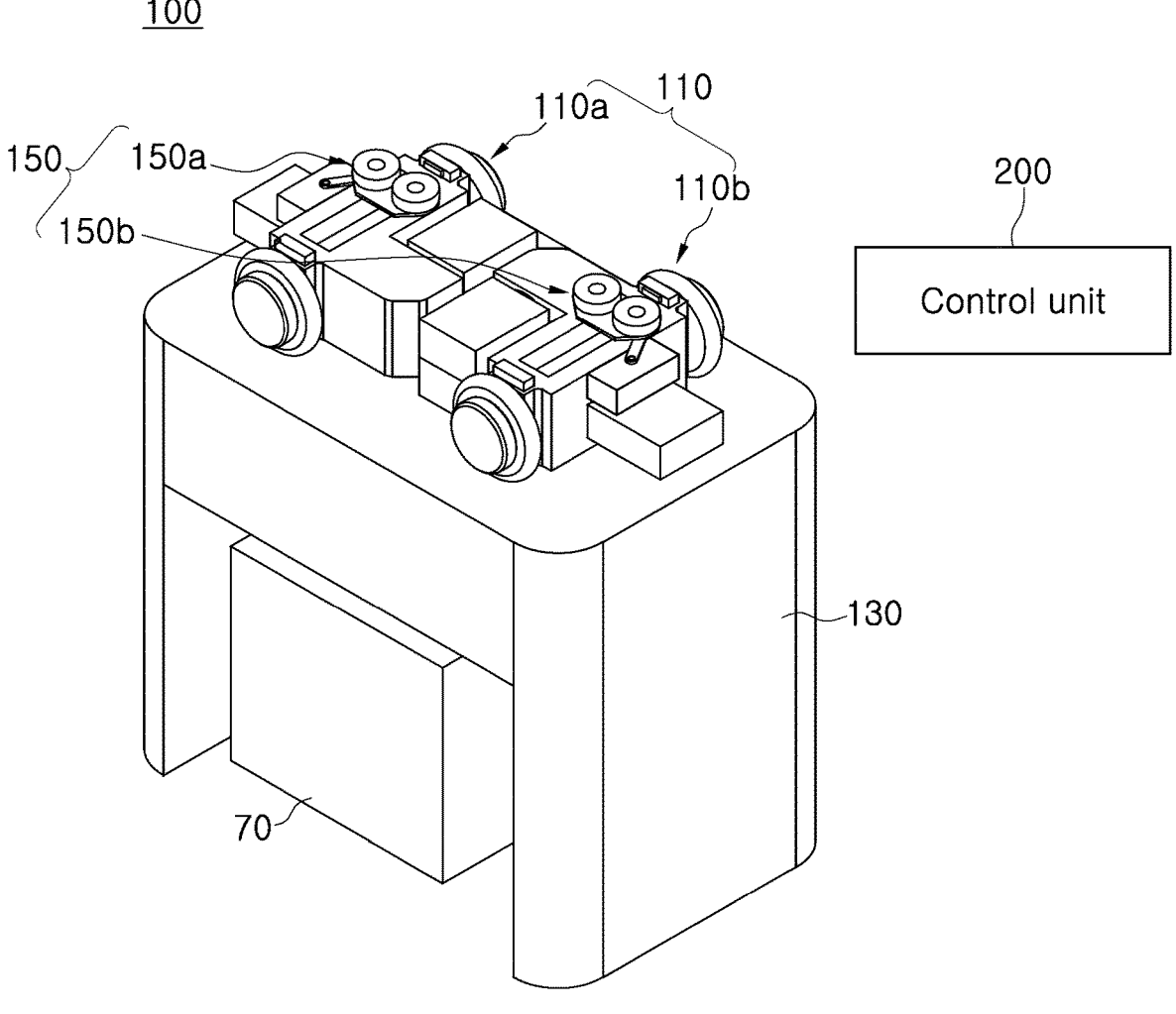
FIGS. 2 and 3 are views illustrating an embodiment of an OHT vehicle according to the present disclosure.
Figure 3:
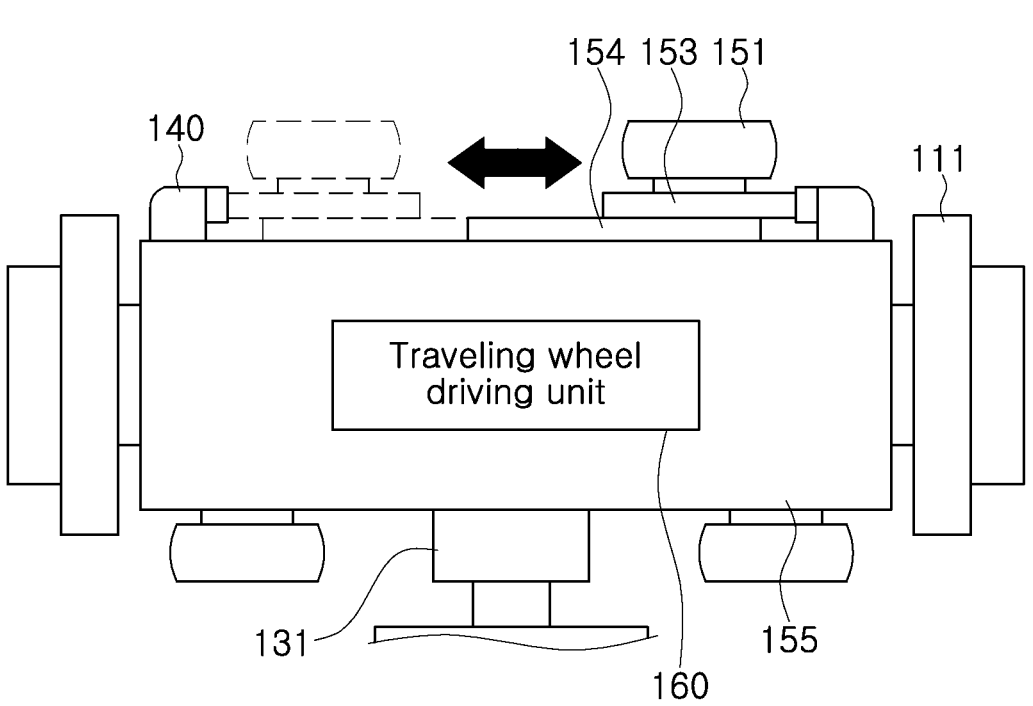
Figure 4A:
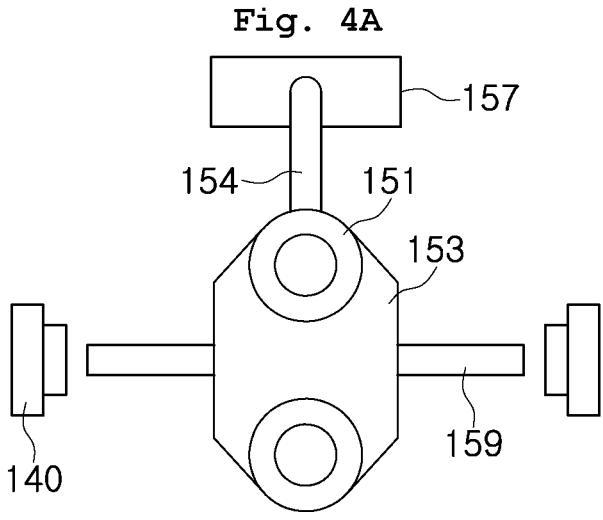
FIGS. 4A to 4C are views illustrating the operation of a steering unit of the OHT vehicle according to the present disclosure.
Figure 4B:
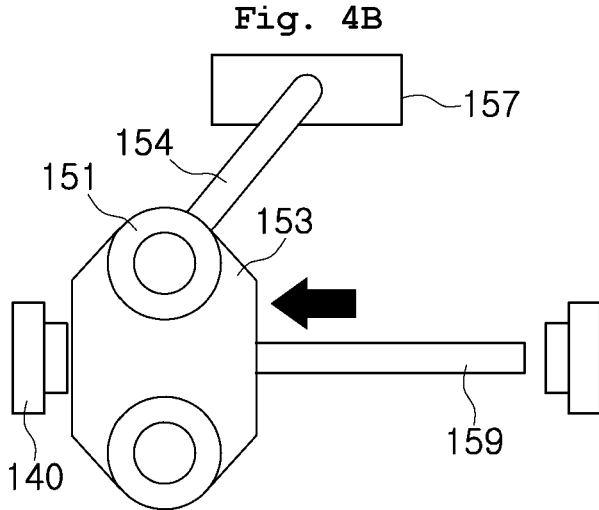
Figure 4C:
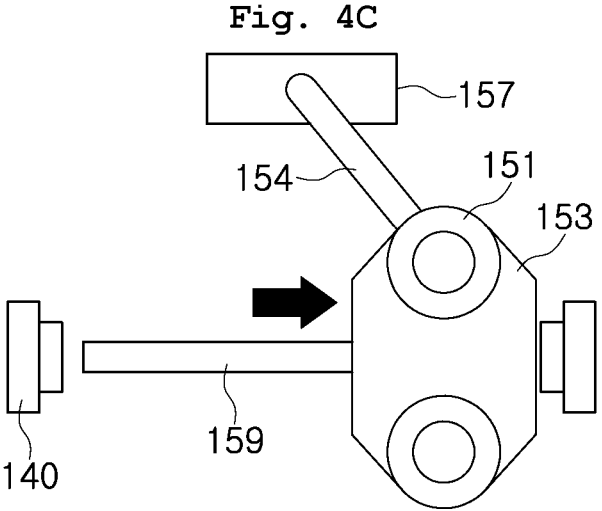

FIGS. 2 and 3 illustrate an embodiment of an OHT vehicle 100 according to the present disclosure. FIGS. 4A to 4C illustrate the operation of a steering unit of the OHT vehicle 100 according to the present disclosure.

The OHT vehicle 100 may include a traveling unit 110, a steering unit 150, and a control unit 200.

The OHT vehicle 100 may include a front end traveling unit 110a (i.e., a pair of front traveling wheels) and a rear end traveling unit 110b (i.e., a pair of rear traveling wheels), and a front end steering unit 150a and a rear end steering unit 150b may be disposed to correspond to the front end traveling unit 110a and the rear end traveling unit 110b, respectively. In an embodiment, the front and rear end traveling units 110a and 110b may be engaged with the rail, and move along the rail.

A traveling wheel 111 may be provided at each side of a body 155, and a traveling wheel driving means 160 may be provided inside the body 155. The traveling wheel driving means 160 rotates the respective traveling wheels 111, so that the vehicle 100 may be traveled in conjunction with the rotation of the traveling wheels 111 in a state where the traveling wheels 111 are in contact with the rail. In an embodiment, the traveling wheel driving means may include a motor and a shaft which delivers forward or reverse torque according to a current direction applied to the motor.

The steering unit 150 may be coupled to the body 155. The steering unit 150 may include a steering wheel 151, a branch 153, and a rotary bar 154.

The steering wheel 151 is provided on an upper portion of the body 155, and the steering wheel 151 may be provided to be movable in a horizontal direction perpendicular to the traveling direction. The steering wheel 151 may be in selective contact with a steering rail. The steering wheel 151 may be movable in left and right directions, so that the traveling direction of the vehicle 100 may be changed under the guidance the steering rail as the steering wheel 151 is moved.

The steering wheel 151 may be rotatably coupled to the branch 153. The rotation direction of the steering wheel 151 may be perpendicular to the rotation direction of the traveling wheel 111.

The steering wheel 151 may be coupled to a guide rail 159 provided on an upper surface of the body 155 via the branch 153. As an example, a fastening member for the steering wheel 151 may be provided on an upper surface of the branch 153, and a coupling protrusion inserted into a recess of the guide rail 159 and guided along the guide rail 159 may be provided on a lower surface of the branch 153.

The rotary bar 154 may be coupled to a side of the branch 153. The rotary bar 154 may be connected to a steering wheel driving means 157. The rotary bar 154 may have a first end connected to the steering wheel driving means 157 and a second end connected to the branch 153. The second end of the rotary bar 154 may be rotated with respect to the first end.

The steering wheel driving means 157 may include a solenoid motor to rotate the rotary bar 154 or a stepping motor. A manner in which the steering wheel driving means 157 rotates the rotary bar 154 may be variously modified.

As the steering wheel driving means 157 rotates the rotary bar 154, the branch 153 may be moved in the left and right directions under the guidance of the guide rail 159. The steering wheel 151 coupled to the branch 153 may be moved in the left and right directions in conjunction with the left and right movements of the branch 153.

The moving direction of the steering wheel 151 may be determined in accordance with the direction of the current applied to the steering wheel driving means 157. For example, in the case where a positive (+) direction current is applied to the steering wheel driving means 157 to rotate the motor clockwise, the steering wheel 151 may be moved to the left. On the other hand, in the case where a negative (−) direction current is applied to the steering wheel driving means 157 to rotate the motor counterclockwise, the steering wheel 151 may be moved to the right.

The steering unit 150 may include a damper 140. The damper 140 may limit the movement of the branch 153 or the steering wheel 151. For example, the damper 140 may limit the movement width of the branch 153 or the steering wheel 151.

When viewed from above, the damper 140 may be located at each side of the movement line of the branch 153. In an embodiment, the respective dampers 140 may be disposed adjacent to opposite ends of the guide rail 159.

The damper 140 may be provided with an impact buffering member for absorbing an impact upon contact due to the movement of the branch 153 or the steering wheel 151.

Furthermore, the damper 140 may be provided with a magnet member for holding the position after the steering wheel 151 is moved. In this case, a metal member or a magnet member may be provided at a portion of the branch 153 that corresponds to the magnet member of the damper 140 and makes contact with the damper 140.

In the present disclosure, the traveling of the traveling unit 110 and the left and right movements of the steering unit 150 may be controlled by the control unit.

A container holding unit 130 may be connected to the body 155 through a neck 131.

The container holding unit 130 may be provided with an inner space. A slider, a lifting member, a grip member, etc. may be provided in the inner space, so that a container 70 may be stored in the inner space of the container holding unit 130.

Figure 5:
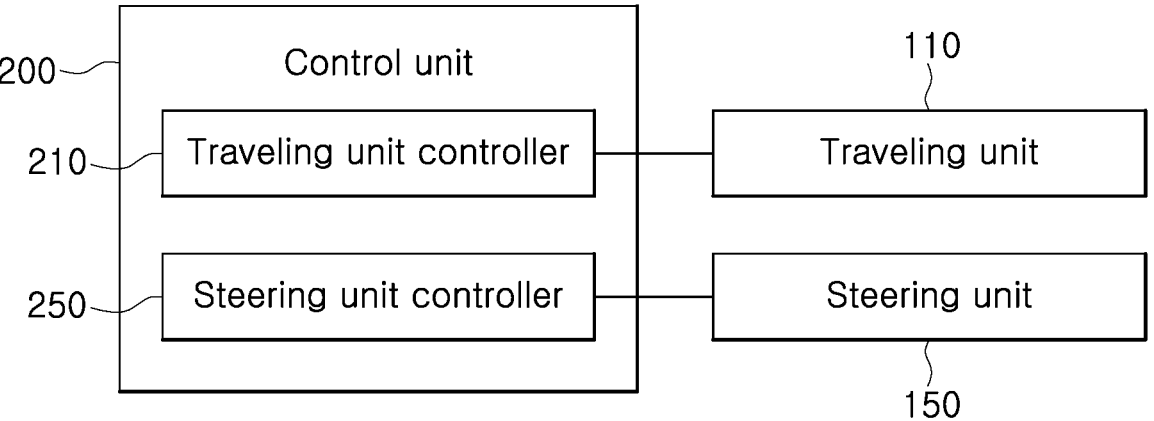
FIG. 5 and FIGS. 6A and 6B are block diagrams illustrating an embodiment of a control unit of the OHT vehicle according to the present disclosure.
Figure 6A:
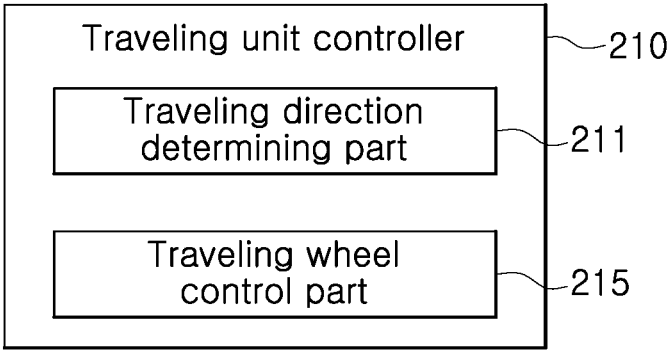
Figure 6B:
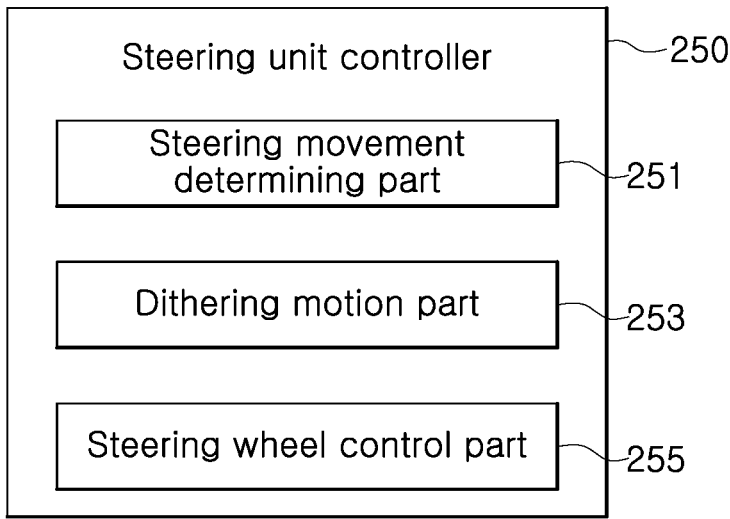

FIG. 5 and FIGS. 6A and 6B illustrate block diagrams of an embodiment of a control unit 200 of the OHT vehicle 100 according to the present disclosure.

The control unit 200 may include a traveling unit controller 210 and a steering unit controller 250.

The traveling unit controller 210 may control the traveling of the traveling unit 110. As an example, the traveling unit controller 210 may control the traveling of the traveling wheel 111 of the traveling unit 110 by controlling the traveling wheel driving means of the traveling unit 110.

In addition, the steering unit controller 250 may control the left and right movements of the steering wheel 151 of the steering unit 150 by controlling the steering wheel driving means 157 of the steering unit 150.

As an example, the OHT vehicle 100 may include the front end traveling unit 110a and the rear end traveling unit 110b, and the traveling unit controller 210 may individually control the front end traveling unit 110a and the rear end traveling unit 110b. In addition, the OHT vehicle 100 may include the front end steering unit 150a and the rear end steering unit 150b corresponding to the front end traveling unit 110a and the rear end traveling unit 110b, and the steering unit controller 250 may individually control the front end steering unit 150a and the rear end steering unit 150b.

The traveling unit controller 210 may include a traveling direction determining part 211 and a traveling wheel control part 215 (i.e., a traveling wheel controller).

The traveling direction determining part 211 may determine the traveling direction of the vehicle 100. For example, when the OHT vehicle 100 is traveled from an arbitrary port to a destination port, the traveling direction determining part 211 may determine in which direction the OHT vehicle 100 has to be traveled in a branching region of the rail where the OHT vehicle 100 is currently traveling.

The traveling wheel control part 215 may control traveling of the OHT vehicle 100 by controlling the traveling wheel driving means of the traveling unit 110. As an example, the traveling direction and the traveling speed of the OHT vehicle 100 may be controlled by controlling the current applied to a motor of the traveling wheel driving means to control the rotation direction and the rotation speed of the traveling wheel 111.

The steering unit controller 250 may include a steering movement determining part 251, a dithering motion part 253, and a steering wheel control part 255.

The steering movement determining part 251 may determine the left-right moving direction of the steering wheel 151 of the steering unit 150 in accordance with the traveling direction determination of the traveling direction determining part 211.

In an embodiment, the steering movement determining part 251 may determine the current position of the steering wheel 151 and determine whether it is necessary to move the steering wheel 151 in accordance with the traveling direction of the OHT vehicle 100 in the branching region of the rail.

Furthermore, the steering movement determining part 251 may determine the moving state of the steering wheel 151 by applying to the steering wheel driving means 157, a moving determination current corresponding to the moving direction of the steering wheel 151. For example, the steering movement determining part 251 may apply a predetermined level of moving determination current to the steering wheel driving means 157 to determine the state of the steering wheel 151, and when it is determined that the movement of the steering wheel 151 is efficient, a dithering motion for the steering wheel 151 may not be performed.

The dithering motion part 253 may apply a dithering motion to the steering wheel 151 by controlling the steering wheel driving means 157 of the steering unit 150 to sequentially and repeatedly apply a forward torque corresponding to the moving direction of the steering wheel 151 of the steering unit 150 and a reverse torque.

In an embodiment, since the steering wheel driving means 157 moves the steering wheel 151 through the rotation of the solenoid motor, the dithering motion part 253 may apply the dithering motion to the steering wheel 151 by controlling the direction and magnitude of the current applied to the steering wheel driving means 157.

As an example, the dithering motion part 253 may apply the dithering motion to the steering wheel 151 by sequentially and repeatedly applying to the steering wheel driving means 157 of the steering unit 150, a forward dithering current corresponding to the moving direction of the steering wheel 151 and a reverse dithering current. In other words, the dithering motion part 253 may repeatedly apply a predetermined level of torque to the steering wheel 151 in forward and reverse directions to cause the steering wheel 151 to be shaken in the left and right directions, resulting in releasing the immovable state of the steering wheel 151.

Here, the dithering motion part 253 may apply a dithering current higher by a set range than a moving current applied to move the steering wheel 151.

The steering wheel control part 255 may control the steering wheel driving means 157 to move the steering wheel 151 in a left direction or a right direction. As an example, the steering wheel control part 255 may apply a moving current to the steering wheel driving means 157 to move the steering wheel 151 in a left direction or a right direction.

Furthermore, after applying the moving current to the steering wheel driving means 157 to move the steering wheel 151, the steering wheel control part 255 may additionally apply a holding current to the steering wheel driving means 157 to cause the steering wheel 151 to maintain its position.

The OHT vehicle according to the present disclosure enables an efficient steering change in the branching regions on the rail through the above-described dithering motion function.

The present disclosure also proposes a method of controlling the operation of the OHT vehicle according to the present disclosure described above. Hereinafter, a description will be given of the method of controlling the operation of the OHT vehicle according to the present disclosure.

The method of controlling the operation of the OHT vehicle according to the present disclosure implemented in the above-described OHT vehicle according to the present disclosure, so the embodiment of the OHT vehicle according to the present disclosure will also be referred to hereinafter.

Figure 7:
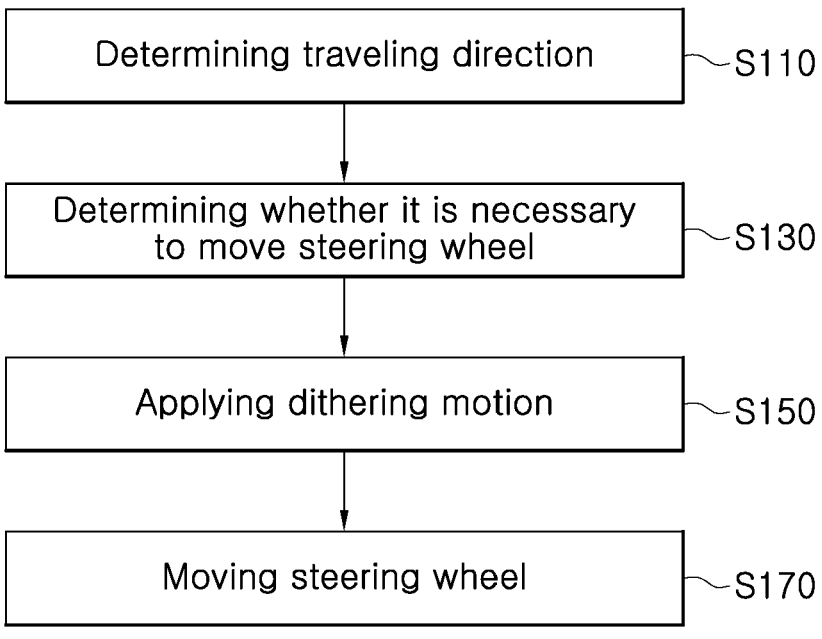
FIG. 7 is a flowchart illustrating an embodiment of a method of controlling the operation of an OHT vehicle according to the present disclosure.

FIG. 7 illustrates a flowchart of an embodiment of a method of controlling the operation of an OHT vehicle 100 according to the present disclosure.

When the OHT vehicle 100 arrives at a branching region on a rail, a control unit 200 may determine the traveling direction of the OHT vehicle 100 (S110).

In addition, the control unit 200 may determine whether it is necessary to move a steering wheel in accordance with the traveling direction of the OHT vehicle 100 (S130). When it is not necessary to move the steering wheel 151 in accordance with the traveling direction of the vehicle 100, the control unit 200 may control only a traveling unit 110 to operate the OHT vehicle 100 without performing separate control on a steering unit 150.

On the other hand, when it is necessary to move the steering wheel 151 in accordance with the traveling direction of the OHT vehicle 100, the control unit 200 may apply a dithering motion to the steering wheel 151 (S150).

The steering unit 150 is provided with a damper 140 for absorbing an impact caused by the movement of the steering wheel 151 while limiting the direction movement of the steering wheel 151. The damper 140 may be provided with an impact absorbing member such as a rubber material for absorbing an impact. In addition, the damper 140 may be provided with a magnet member for maintaining the position after the steering wheel 151 is moved.

Due to such various elements provided at the damper 140, when the steering wheel 151 is moved in one direction and then maintain its position for a long period of time, the steering wheel 151 may be brought into an immovable state where a contact portion of the steering unit 150 is strongly adhered to the damper 140 and thereby the steering wheel 151 cannot be moved with the torque produced by the application of a moving current.

To solve such a problem, in the present disclosure, a dithering motion may be applied to the steering wheel 151.

For example, the control unit 200 may apply the dithering motion to the steering wheel 151 by sequentially and repeatedly applying a forward torque corresponding to the moving direction of the steering wheel 151 and a reverse torque.

In other words, the control unit 200 may apply the dithering motion for releasing the immovable state of the steering wheel 151 by applying torque to the steering wheel 151 in the left and right directions to cause the steering wheel 151 to be shaken.

After applying the dithering motion to the steering wheel 151, the control unit 200 may move the steering wheel 151 in a direction corresponding to the traveling direction of the vehicle 100 (S170).

Each process for the method of controlling the operation of the OHT vehicle 100 according to the present disclosure will be described in more detail.

Figure 8:
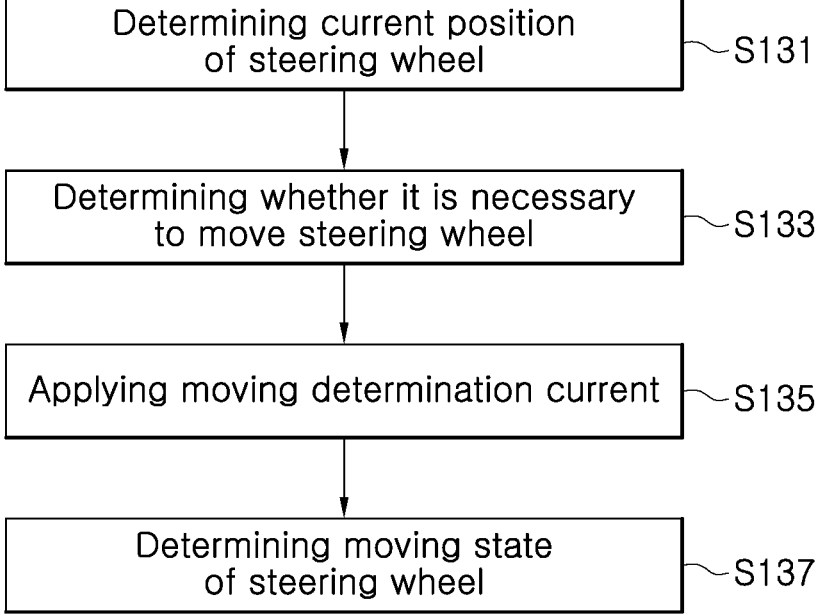
FIG. 8 is a flowchart illustrating an embodiment of a process of determining the moving state of the steering wheel in the method of controlling the operation of the OHT vehicle according to the present disclosure.

FIG. 8 illustrates a flowchart of an embodiment of a process of determining the moving state of the steering wheel 151 in the method of controlling the operation of the OHT vehicle 100 according to the present disclosure.

When the OHT vehicle 100 arrives at a branching region of the rail during the operation of the OHT vehicle 100 and it is necessary to set the direction of the OHT vehicle 100, the control unit 200 may determine the current position of the steering wheel 151 of the steering unit 150 (S131). Then, the control unit 200 may determine whether it is necessary to move the steering wheel 151 on the basis of the current position of the steering wheel 151 (S133).

Figure 10:
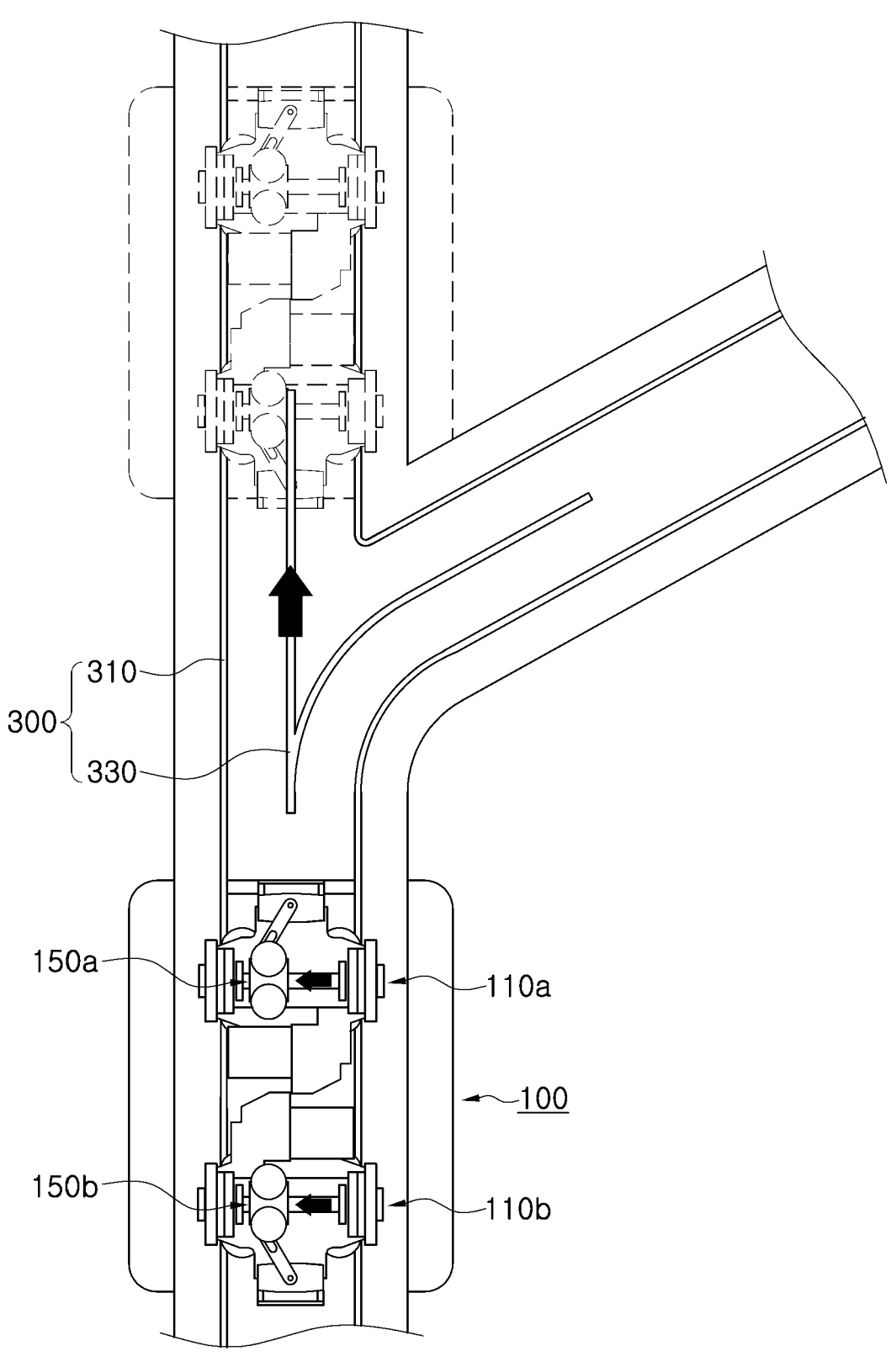
FIGS. 10 and 11 are views illustrating an example of a steering operation on a rail of the OHT vehicle according to the present disclosure.
Figure 11:
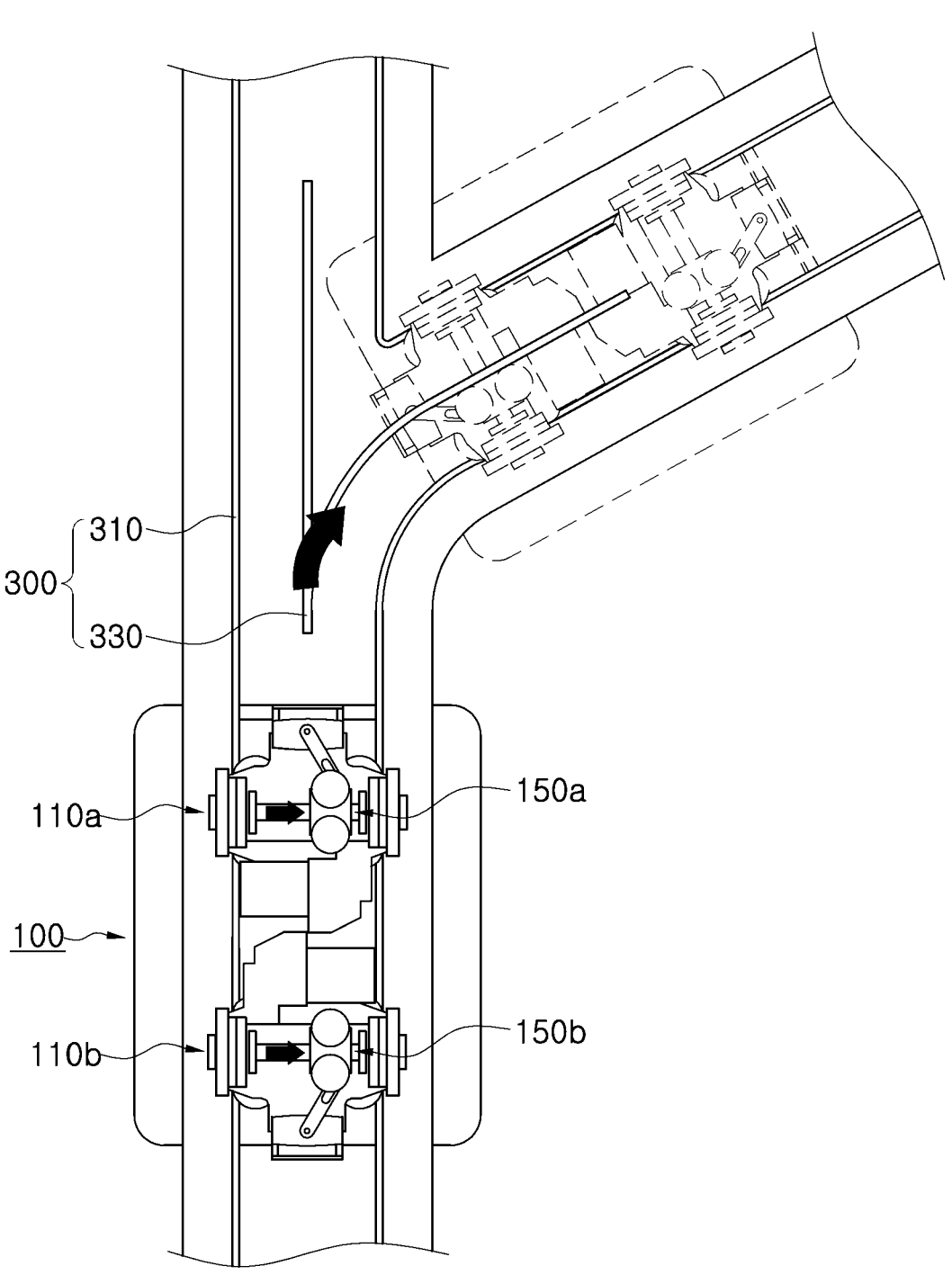

As an example, referring to the steering operation illustrated in FIGS. 10 and 11, FIG. 10 illustrates a case of straight forward traveling in a branching region, and FIG. 11 illustrates a case of a right turning in the branching region.

The OHT vehicle 100 may include a front end traveling unit 110a and a rear end traveling unit 110b, and may also include a front end steering unit 150a and a rear end steering unit 150b corresponding to the front end traveling unit 110a and the rear end traveling unit 110b, respectively.

The rail 300 may include a traveling rail 310 and a steering rail 330. The steering rail 330 for changing the traveling direction of the OHT vehicle 100 may be provided in each branching region of the rail 300. The traveling direction of the OHT vehicle 100 may be changed under the guidance of the steering rail 330 in accordance with the position of the steering wheel 151 of the OHT vehicle 100.

When the OHT vehicle 100 arrives at the branching region of the rail 300, the control unit 200 may determine the traveling direction and determines whether it is necessary to move the steering wheel 151 on the basis of the current position of the steering wheel 151.

For example, in FIG. 10, in the case where the OHT vehicle 100 is traveled straight forward, when the steering wheel 151 is located on the left side corresponding to the straight forward direction of the steering rail 330 in the branching region, the movement of the steering wheel 151 is not necessary. On the other hand, when the steering wheel 151 is located in the center or on the right side, the steering wheel 151 has to be moved to the left in accordance with the guide direction of the steering rail 330.

As an example, in FIG. 11, in the case where the OHT vehicle 100 makes a right turn, when the steering wheel 151 is located on the right side corresponding to the right turn direction of the steering rail 330 in the branching region, the movement of the steering wheel 151 is not necessary. On the other hand, when the steering wheel 151 is located in the center or on the left side, the steering wheel 151 has to be moved to the right in accordance with the guide direction of the steering rail 330.

Therefore, the control unit 200 may determine whether it is necessary to move the steering wheel 151 by determining the traveling direction of the OHT vehicle 100 and the current position of the steering wheel 151.

Then, when it is necessary to move the steering wheel 151, the control unit 200 may apply a moving determination current to a steering wheel driving means 157 (S135) to determine whether the steering wheel 151 can be properly moved (S137).

Here, as the moving determination current, a current equal to or weaker than a moving current applied to the steering wheel driving means 157 to actually move the steering wheel 151 may be applied.

In other words, the control unit 200 may determine, by using the moving determination current, whether the steering wheel 151 is in a properly movable state or in an immovable state where the steering wheel 151 cannot be moved properly.

When it is determined that the steering wheel 151 is in the properly movable state as a result of the application of the moving determination current, the control unit 200 may directly apply a moving current to the steering wheel driving means 157 without applying the dithering motion to the steering wheel 151 to cause the steering wheel 151 to be moved in a corresponding direction.

On the other hand, when it is determined that the steering wheel 151 is in the immovable state as a result of the application of the moving determination current, the control unit 200 may apply a dithering motion to the steering wheel 151.

Figure 9:
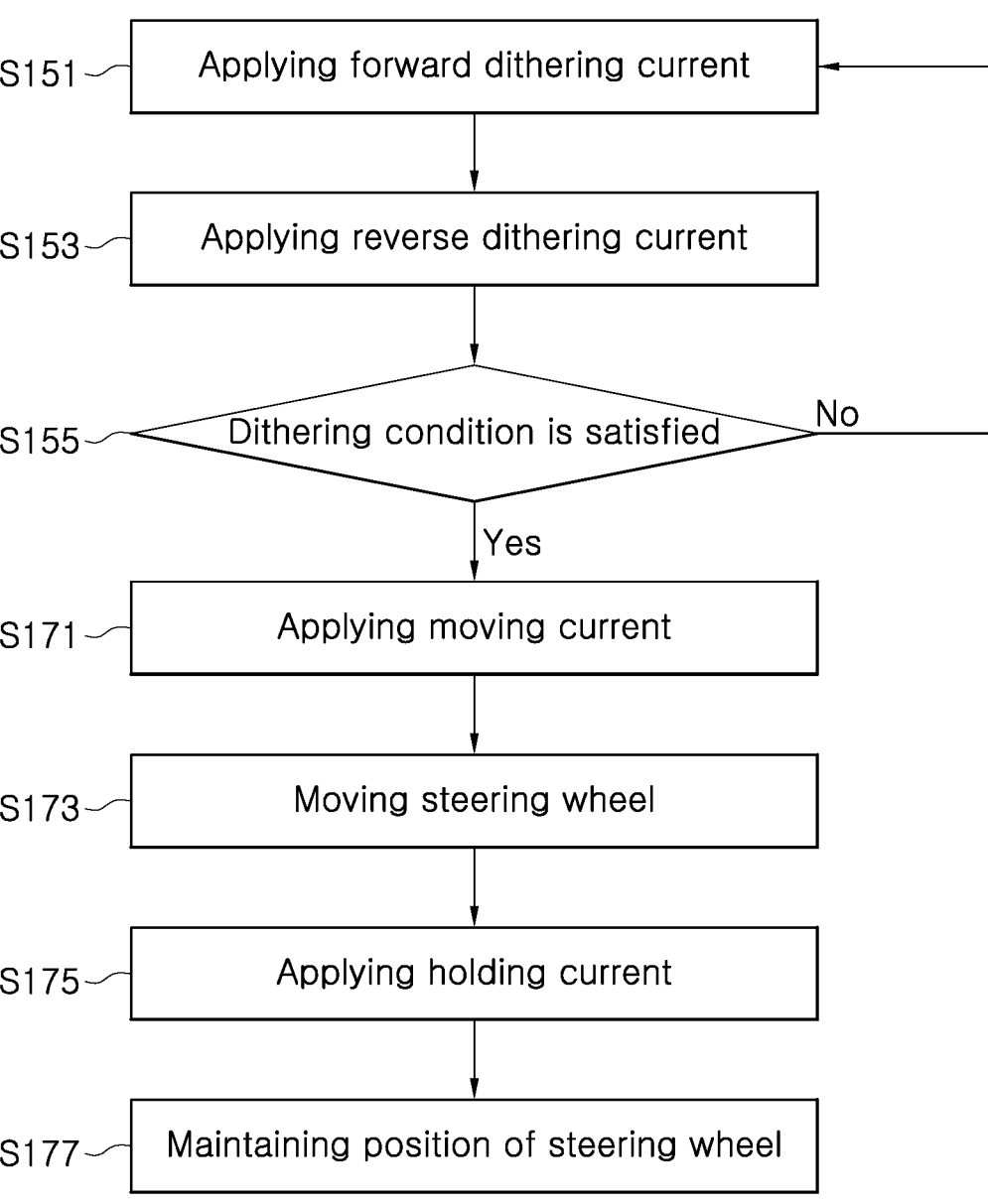
FIG. 9 is a flowchart illustrating an embodiment of a dithering motion application process and a steering wheel moving process in the method of controlling the operation of the OHT vehicle according to the present disclosure.

In regard to the dithering motion process presented by the present disclosure, FIG. 9 illustrates a flowchart of an embodiment of a dithering motion application process and a steering wheel moving process in the method of controlling the operation of the OHT vehicle according to the present disclosure.

The control unit 200 may apply a dithering current to the steering wheel driving means 157 to apply a dithering motion to the steering wheel 151.

For example, the control unit 200 may apply the dithering motion to the steering wheel 151 to cause the steering wheel 151 to be forcibly shaken in the left and right directions by applying a forward dithering current corresponding to the moving direction of the steering wheel 151 to the steering wheel driving means 157 (S151) and then applying a reverse dithering current to the steering wheel driving means 157 (S153).

Referring to FIG. 10, in a situation where the vehicle OHT 100 is traveled straight forward in the branching region of the rail 300 and the steering wheel 151 positioned on the right side has to be moved in the left direction, the control unit 200 may allow the steering wheel 151 to be forcibly shaken by repeatedly applying a forward dithering current for moving the steering wheel 151 to the left and a reverse dithering current for moving the steering wheel 151 to the right to the steering wheel driving means 157.

On the other hand, referring to FIG. 11, in a situation where the vehicle OHT 100 makes a right turn in the branching region of the rail 300 and the steering wheel 151 positioned on the left side has to be moved in the right direction, the control unit 200 may allow the steering wheel 151 to be forcibly shaken by repeatedly applying a forward dithering current for moving the steering wheel 151 to the right and a reverse dithering current for moving the steering wheel 151 to the left to the steering wheel driving means 157.

Here, the dithering current applied by the control unit 200 to the steering wheel driving means 157 may be higher by a set range than a moving current applied to move the steering wheel 151. The set range may be set in consideration of various situations, such as the rail condition, the vehicle weight, etc.

The control unit 200 may determine whether the dithering condition is satisfied (S155). Here, the dithering condition may be whether a set value, such as a time or number of times that the forward dithering current and the reverse dithering current are sequentially and repeatedly applied, is satisfied. Alternatively, it may be determined whether the dithering condition is satisfied by whether the steering wheel 151 can be properly moved by repeatedly applying the dithering current for a predetermined time or a predetermined number of times and then applying the moving determination current.

As described above, by applying the dithering motion to the steering wheel 151 to cause the steering wheel 15 to be forcibly shaken, the steering wheel 151 may be released from the immovable state.

When the steering wheel 151 is released from the immovable state as a result of the application of the dithering motion, the control unit 200 may apply a moving current corresponding to a corresponding direction to the steering wheel driving means 157 (S171) to allow the steering wheel 151 to be efficiently moved (S173).

When the steering wheel 151 is moved, the control unit 200 may apply a holding current to the steering wheel driving means 157 (S175) to cause the steering wheel 151 to maintain its position (S177).

The maintaining of the position of the steering wheel 151 may be performed by applying the holding current in the same direction as the moving current so that the steering wheel 151 is prevented from being bounced back in the opposite direction when a portion of the steering unit 150 collides with the damper 140 as the steering wheel 151 is moved.

Here, as the holding current, a current lower than the moving current may be applied.

Each process described above may be performed by the control unit 200 for each of the front end steering unit 150*a* and the rear end steering unit 150*b* of the OHT vehicle 100.

Figure 12A:
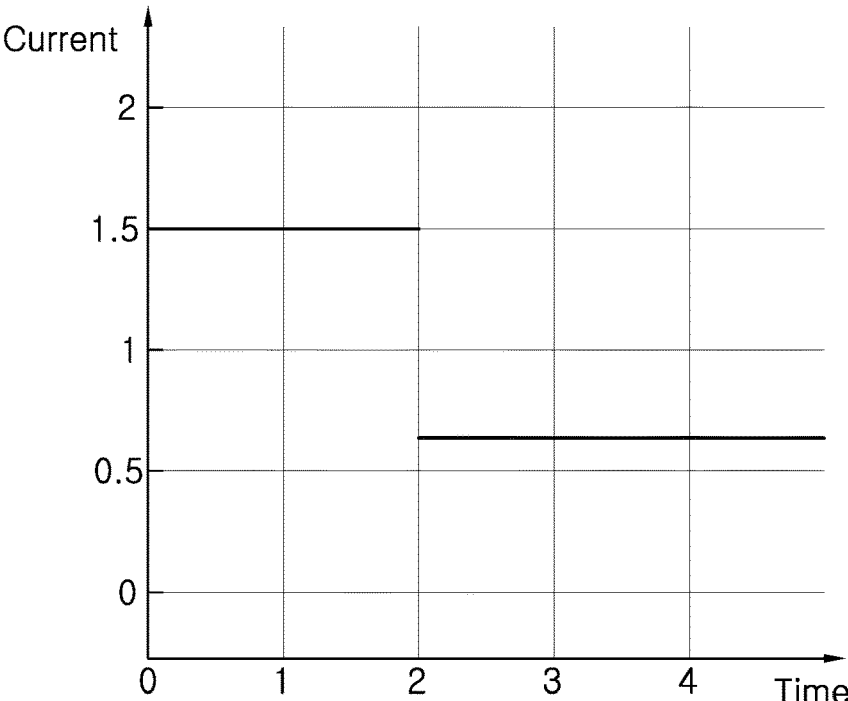
FIGS. 12A and 12B and FIG. 13 are graphs illustrating an embodiment of a current application process according to a steering motion profile in the method of controlling the operation of the OHT vehicle according to the present disclosure.
Figure 12B:
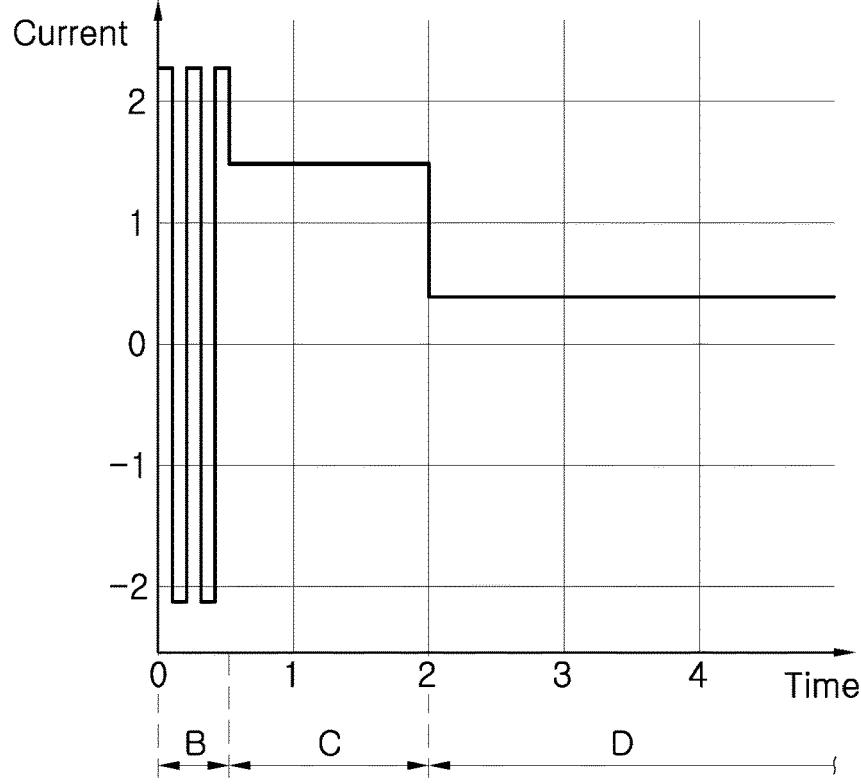
Figure 13:
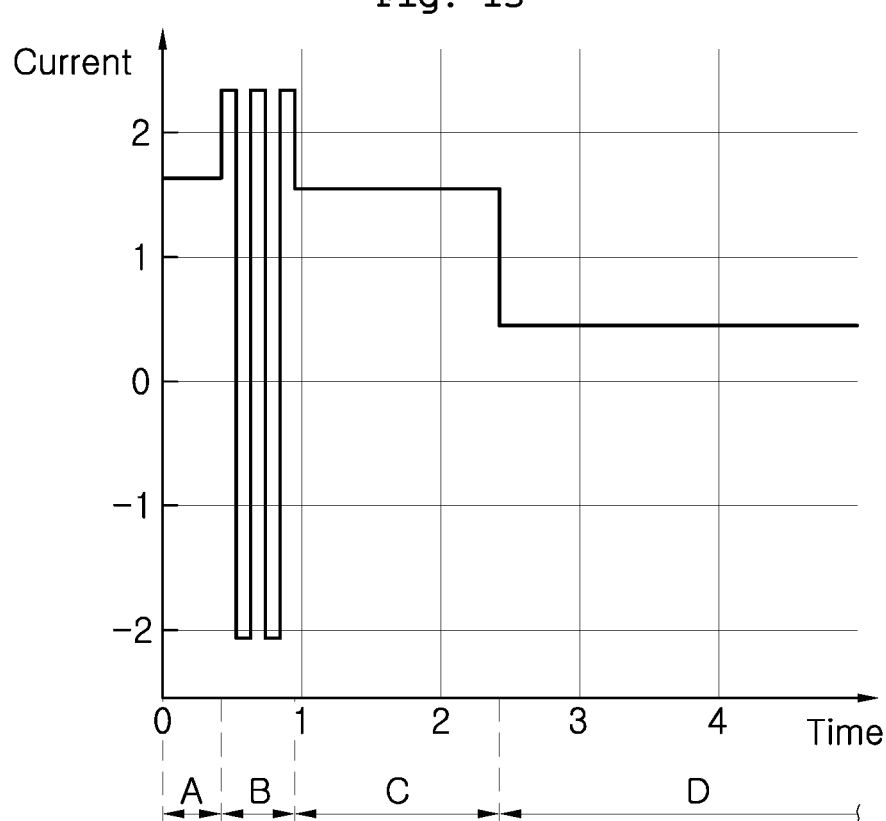

FIGS. 12A and 12B and FIG. 13 illustrate graphs of an embodiment of a current application process according to a steering motion profile in the method of controlling the operation of the OHT vehicle 100 according to the present disclosure.

FIG. 12A illustrates a steering motion profile when the steering wheel is in a properly movable state.

When the steering wheel is in the properly movable state, the control unit may immediately apply a moving current of 1.5 A to cause the steering wheel to be moved in a corresponding direction. In addition, after moving the steering wheel, the control unit may apply a holding current of 0.6 A to cause the steering wheel to maintain its position.

FIG. 12B illustrates a steering motion profile when the steering wheel is in an immovable state where the steering wheel cannot be properly moved.

When the steering wheel is in the immovable state, the control unit may apply a current in accordance with a profile divided into a dithering section (B), a moving section (C), and a holding section (D).

First, the control unit may apply a dithering current to cause the steering wheel to be released from the immovable state. Here, the dithering current may be higher than the moving current of 1.5 A.

To apply a dithering motion to the steering wheel to cause the steering wheel to be forcibly shaken, the control unit may repeatedly apply a forward dithering current having an absolute value larger than that of the moving current and a reverse dithering current, in the foam of pulse waves.

When the steering wheel is released from the immovable state as a result of the application of the dithering motion to the steering wheel in the dithering section, the control unit may apply a moving current of 1.5 A to cause the steering wheel to be moved, and may also apply a holding current of 0.6 A to cause the steering wheel to maintain its position.

Furthermore, the control unit may determine the moving state of the steering wheel and apply the dithering motion thereto. FIG. 13 illustrates a steering motion profile in which the dithering motion is applied in accordance with the moving state of the steering wheel.

The control unit may apply a current in accordance with a profile divided into a moving state determining section (A), a dithering section (B), a moving section (C), and a holding section (D).

First, the control unit may apply a moving determination current to the steering wheel to determine the moving state of the steering wheel. Here, the moving determination current may be equal to the moving current of 1.5 A, and depending on situations, a current lower than the moving current may be applied.

The control unit may determine whether the steering wheel can be moved properly by applying the moving determination current, and when it is determined that the steering wheel cannot be moved properly as a result of the application of the moving determination current, may apply sequential currents on the basis of the steering motion profile illustrated in FIG. 12B.

The current value presented in the steering motion profile of FIGS. 12A and 12B and FIG. 13 is an example, and the current value applied by the control unit in each process may be appropriately changed in consideration of various factors.

As described above, the present disclosure provides a dithering motion function for shaking the steering wheel to cause the steering wheel to be released from the immovable state, thereby achieving an efficient steering change of the OHT vehicle.

In particular, the present disclosure can solve the problem in which when the steering of the vehicle is not properly performed in the branching regions in a situation where tens to hundreds of vehicles are simultaneously operating on the rail, a collision occurs between a preceding vehicle and a following vehicle or the overall cargo transfer is delayed.

Furthermore, the present disclosure can minimize an impact caused by the dithering motion by determining whether the steering wheel can be moved properly and providing the dithering motion when the steering wheel is in an immovable state.

While the exemplary embodiments of the disclosure have been described above, those skilled in the art will appreciate that various modifications, additions, and substitutions are possible, without departing from the scope and spirit of the disclosure. Therefore, the embodiments disclosed in this specification are only for illustrative purposes rather than limiting the technical spirit of the present disclosure. The scope of the present disclosure should be defined only by the accompanying claims and equivalents thereof.

What is claimed is:

1. A method of controlling operation of an OHT vehicle, the method comprising:
   a steering wheel movement determining step of determining a moving direction of a steering wheel in accordance with a traveling direction of the OHT vehicle in a branching region of a rail;
   determining whether the steering wheel is an immovable state;
   a dithering motion applying step of applying, in response to the determining that the steering wheel is in the immovable state, a dithering motion to the steering wheel; and
   a steering wheel moving step of moving the steering wheel in accordance with the traveling direction of the OHT vehicle.

2. The method of claim 1,
   wherein the dithering motion applying step is performed by applying the dithering motion to the steering wheel by sequentially and repeatedly applying a forward torque in the moving direction of the steering wheel and a reverse torque in a direction opposite to the moving direction of the steering wheel.

3. The method of claim 1,
   wherein the dithering motion applying step is performed by applying the dithering motion to the steering wheel by sequentially and repeatedly applying a forward dithering current and a reverse dithering current to a steering wheel driving means,
   wherein the forward dithering current corresponds to the moving direction of the steering wheel.

4. The method of claim 3,
   wherein the dithering motion applying step is performed by applying a dithering current higher by a set range than a moving current applied to the steering wheel driving means to move the steering wheel.

5. The method of claim 3,
   wherein the dithering motion applying step is performed by repeatedly performing the applying of the dithering motion to the steering wheel in accordance whether a set dithering condition is satisfied.

6. The method of claim 1,
   wherein the steering wheel movement determining step includes:
   applying a moving determination current corresponding to the moving direction of the steering wheel to a steering wheel driving means; and
   determining a moving state of the steering wheel.

7. The method of claim 1,
   wherein the steering wheel movement determining step comprises:
   determining the traveling direction of the OHT vehicle in the branching region on the rail; and
   determining whether to move the steering wheel in accordance with the traveling direction of the OHT vehicle on the basis of a current position of the steering wheel.

8. The method of claim 1,
   wherein the steering wheel moving step comprises:
   moving the steering wheel by applying a moving current corresponding to the moving direction of the steering wheel; and
   maintaining a position of the steering wheel by applying a holding current.

9. The method of claim 1,
   wherein the steering wheel movement determining step or the steering wheel moving step is performed for each of a front end steering wheel and a rear end steering wheel.

10. An OHT vehicle comprising:

a traveling unit configured to travel along a rail;

a steering unit including a steering wheel and configured to change a traveling direction of the traveling unit; and a control unit configured to:

determine a moving direction of the steering unit in accordance with the traveling direction of the traveling unit in a branching region on the rail, and determine whether the steering wheel is an immovable state, control, in response to determining that the steering wheel is in the immovable state, a dithering motion of the steering unit and movement of the steering unit.

11. The OHT vehicle of claim 10, wherein the control unit controls a steering wheel driving means of the steering unit by sequentially and repeatedly applying a forward torque in the moving direction of the steering wheel of the steering unit and a reverse torque in a direction opposite to the moving direction.

12. The OHT vehicle of claim 11, wherein the control unit comprises:

a steering unit controller configured to apply the dithering motion to the steering wheel by sequentially and repeatedly applying a forward dithering current and a reverse dithering current to the steering wheel driving means of the steering wheel, and wherein the forward dithering current corresponds to the moving direction of the steering wheel.

13. The OHT vehicle of claim 12, wherein the steering unit controller comprises:

a dithering motion part configured to apply the dithering motion to the steering wheel by sequentially and repeatedly applying the forward dithering current and the reverse dithering current to the steering wheel driving means; and a steering wheel control part configured to move the steering wheel by applying a moving current to the steering wheel driving means.

14. The OHT vehicle of claim 13, wherein the steering wheel control part maintains a position of the steering wheel by applying a holding current to the steering wheel driving means after the steering wheel is moved as a result of the application of the moving current.

15. The OHT vehicle of claim 13, wherein the dithering motion part applies a dithering current higher by a set range than the moving current applied to move the steering wheel.

16. The OHT vehicle of claim 13, wherein the steering unit controller further comprises a steering movement determining part configured to determine whether to move the steering wheel in accordance with the traveling direction of the OHT vehicle on the basis of a current position of the steering wheel.

17. The OHT vehicle of claim 16, wherein the steering movement determining part determines a moving state of the steering wheel by applying a moving determination current corresponding to the moving direction of the steering wheel to the steering wheel driving means.

18. The OHT vehicle of claim 11, wherein the control unit further comprises a traveling unit controller configured to:

determine the traveling direction in the branching region on the rail; and control a traveling wheel driving means of the traveling unit.

19. The OHT vehicle of claim 10, wherein the steering unit comprises a front end steering unit and a rear end steering unit, and wherein the control unit controls the dithering motion and movement of each of the front end steering unit and the rear end steering unit.

20. A method of controlling operation of an OHT vehicle, the method comprising:

a steering wheel movement determining step of determining a traveling direction of the OHT vehicle in a branching region on a rail and determining whether it is necessary to move a steering wheel in accordance the traveling direction of the OHT vehicle on the basis of a current position of the steering wheel;

determining whether the steering wheel is an immovable state;

a dithering motion applying step of applying, in response to the determining that the steering wheel is in the immovable state, a dithering motion to the steering wheel by sequentially and repeatedly applying to a steering wheel driving means, a forward dithering current corresponding to a moving direction of the steering wheel and a reverse dithering current for a set dithering time; and a steering wheel moving step of applying to the steering wheel driving means, a moving current corresponding to the moving direction of the steering wheel to cause the steering wheel to be moved, and applying a holding current to cause the steering wheel to maintain its position.

* * * * *